(12) United States Patent
Takagi

(10) Patent No.: US 7,636,120 B2
(45) Date of Patent: Dec. 22, 2009

(54) IMAGE-DATA OUTPUT DEVICE AND DIGITAL CAMERA

(75) Inventor: Masaaki Takagi, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 608 days.

(21) Appl. No.: 11/546,356

(22) Filed: Oct. 12, 2006

(65) Prior Publication Data

US 2007/0085909 A1     Apr. 19, 2007

(30) Foreign Application Priority Data

Oct. 13, 2005    (JP)    ............................ P2005-298552

(51) Int. Cl.
*H04N 5/222* (2006.01)
*H04N 5/06* (2006.01)
(52) U.S. Cl. .................................. 348/333.01; 348/521
(58) Field of Classification Search ....................... None
See application file for complete search history.

(56) References Cited

U.S. PATENT DOCUMENTS 6,069,619 A * 5/2000 Kim ............................ 345/211

FOREIGN PATENT DOCUMENTS

JP    2003-87639 A    3/2003

* cited by examiner

*Primary Examiner*—Justin P Misleh
(74) *Attorney, Agent, or Firm*—Birch, Stewart, Kolasch & Birch, LLP

(57) ABSTRACT

An image-data output device that outputs image data and a signal for an output control device to load the image data, the output control device taking control of outputting the image data to a device, is provided and includes: a first signal generating section that generates a vertical synchronizing signal for the output control device to load the image data; a second signal generating section that generates a horizontal synchronizing signal; a third signal generating section that generates an outputting-image-data synchronizing signal for the output control device to load the image data, the outputting-image-data synchronizing signal having a suspension period in a duration that the vertical synchronizing signal is effective and the horizontal synchronizing signal is ineffective; a first output terminal that outputs the vertical synchronizing signal to the output control device; and a second output terminal that outputs the outputting-image-data synchronizing signal to the output control device.

5 Claims, 3 Drawing Sheets

IMAGE-DATA OUTPUT DEVICE AND DIGITAL CAMERA

BACKGROUND OF THE INVENTION

1. Field of the Invention

The present invention relates to an image-data output device that outputs image data and a signal for an output control device to load the image data, the output control device taking control of outputting the image data to a device.

2. Description of Related Art

In the related art, the DSP (digital signal processor), mounted on a digital camera for example, generates recording image data from an image signal obtained from the imaging device, as well as vertical, horizontal and image-data synchronizing signals for a recording-medium drive, which is for recording the image data to a recording medium, to load the image signal, and thus outputs those signals and the image data to the recording-medium drive. The recording-medium drive loads the image data through sampling the image data at a rise of an image-data synchronizing signal in a duration both the vertical and horizontal synchronizing signals are effective, and records the image data thus loaded to the recording medium.

In the digital camera of the related art, the DSP outputs an image-data synchronizing signal in a duration that the vertical synchronizing signal is effective even if the horizontal synchronizing signal is ineffective. However, image data could not be sampled in the period when the horizontal synchronizing signal is ineffective, in which period the image-data synchronizing signal is outputted uselessly. In the case where the number of pixels in the image data outputted from the DSP is not many, there is an increase in the period when the horizontal synchronizing signal is ineffective, thus uselessly outputting especially image-data synchronizing signals in this duration.

JP-A-2003-87639 discloses an art that the operation clock, to be supplied to the various signal-processing blocks in the DSP, is to be suspended in a time other than operating the blocks. However, there is not included such a disclosure to control a signal to be outputted from the DSP to the subsequent devices.

SUMMARY OF THE INVENTION

An object of an illustrative, non-limiting embodiment of the invention is to diminish consumption power in an image-data output device that outputs an image data and a signal for an output control device to load the image data, the output control device taking control of outputting the image data to a device.

An image-data output device according to one aspect of the invention is a device that outputs image data and a signal for an output control device to load the image data, the output control device taking control of outputting the image data to a device, the image-data output device including: a vertical-synchronizing-signal generating section (a first signal generating section) that generates a vertical synchronizing signal; a horizontal-synchronizing-signal generating section (a second signal generating section) that generates a horizontal synchronizing signal; an outputting-image-data synchronizing signal generating section (a third signal generating section) that generates an outputting-image-data synchronizing signal for the output control device to load the image data, the outputting-image-data synchronizing signal having a suspension period in a duration that the vertical synchronizing signal is effective and the horizontal synchronizing signal is ineffective; a first output terminal for outputting the vertical synchronizing signal as the signal to the output control device; and a second output terminal for outputting the outputting-image-data synchronizing signal as the signal to the output control device.

In one aspect of the invention, the outputting-image-data synchronizing generating section includes: an image-data-synchronizing-signal generating unit (a first signal generating unit) that generates an image-data synchronizing signal for the output control device to load the image data; a detecting-signal generating unit (a second signal generating unit) that generates a detecting signal for detecting a rise of the horizontal synchronizing signal; a masking-signal generating unit (a third signal generating unit) that generates a masking signal based on the vertical synchronizing signal, the horizontal synchronizing signal and the detecting signal, wherein the masking signal rises at a rise of the detecting signal for detecting a rise of the horizontal signal becoming effective in a period when the vertical synchronizing signal is effective, the masking signal falls at a fall of the horizontal synchronizing signal right after the rise of the detecting signal; and a masking unit that makes a masking, based on the image-data synchronizing signal and the masking signal, on the image-data synchronizing signal in a period when the masking signal is ineffective, so as to generate the outputting-image-data synchronizing signal.

In one aspect of the invention, a third output terminal for outputting the horizontal synchronizing signal as the signal to the output control device is further provided.

A digital camera according to one aspect of the invention includes the image-data output device.

BRIEF DESCRIPTION OF THE DRAWINGS

The features of the invention will appear more fully upon consideration of the exemplary embodiments of the inventions, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and its modifications do not restrict the invention.

According to exemplary embodiments, consumption power can be diminished in an image-data output device that outputs an image data and a signal for an output control device to load the image data, the output control device taking control of outputting the image data to a device.

In the specification, the wording "a signal is effective" means that the signal is in a higher level, and the wording "the signal is ineffective" means that the signal is in a lower level.

With reference to the drawings, description is now made below on an exemplary embodiment of the present invention.

Figure 1:
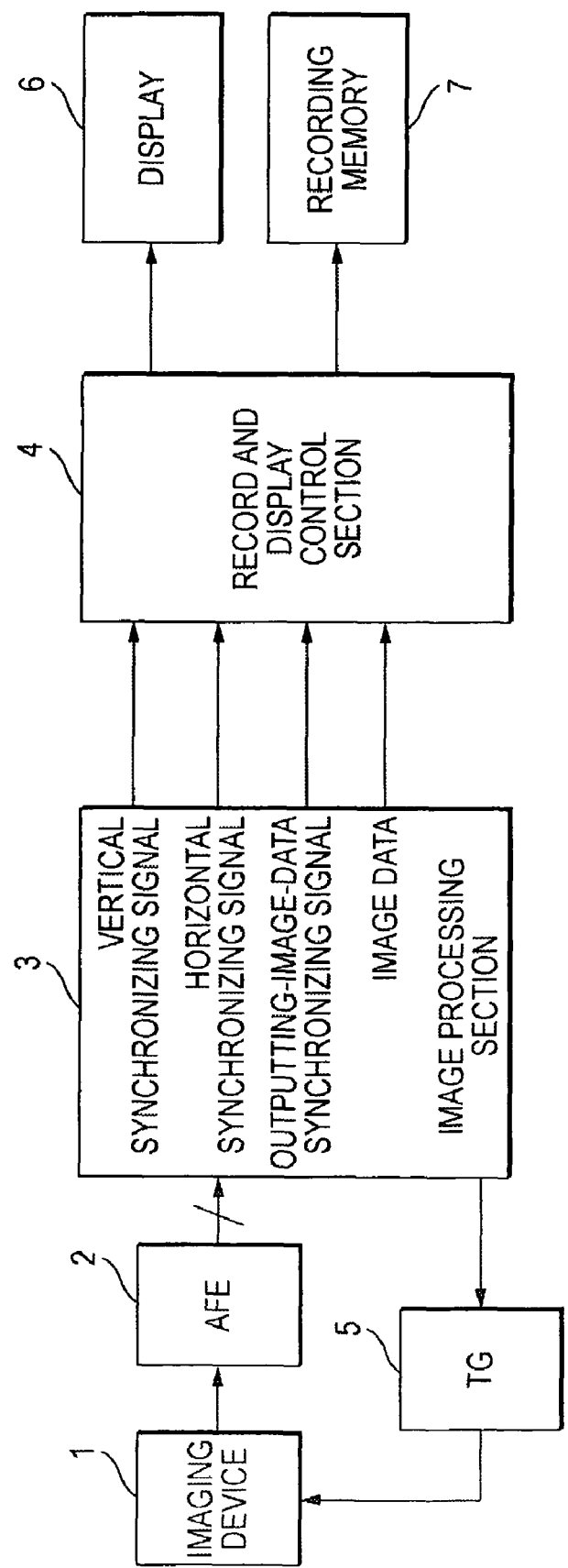
FIG. 1 is a diagram showing a schematic configuration of a digital camera, for explaining an exemplary embodiment according to the present invention.

FIG. 1 is a diagram showing a schematic configuration of a digital camera, for explaining an exemplary embodiment of the invention.

The digital camera, shown in FIG. 1, has: an imaging device 1 such as a CCD or CMOS image sensor; an AFE (analog front end) 2 that performs a analog-signal processing on the image signal outputted from the imaging device 1 and converts an analog-signal-processed image signal into a digital signal; an image processing section (DSP) 3 that performs a digital-signal-processing or so on an image signal outputted from the AFE 2; a record and display control section 4 that loads image data outputted from the DSP 3 and take control of outputting the loaded image data to a display 6 or a recording memory 7; the display 6 that displays an image based on the image data; the recording memory 7 that is a recording medium to record the image data; and a TG (timing generator) 5 that generates a timing signal to drive the imaging device 1.

The processing, to be made by the image processing section 3, includes black-level correction (OB processing), linear-matrix correction, white-balance adjustment, gamma correction, synchronization and Y/C conversion. The image processing section 3 also generates displaying-image data to be displayed on the display 6 and recording-image data to be recorded into the recording memory 7.

The image processing section 3 functions as an image-data output device that outputs, to the record and display control section 4, image data (display-image data and recording-image data) and a signal for the record and display control section 4 to load the image data. The image processing section 3 generates a vertical synchronizing signal, a horizontal synchronizing signal and outputting-image-data synchronizing signal, as signals for the record and display control section 4 to load image data. The outputting-image-data synchronizing signal is a signal for the record and display control section 4 to load image data, which signal has a suspension period in the duration the vertical synchronizing signal is effective and the horizontal synchronizing signal is ineffective.

The record and display control section 4 load image data according to a vertical synchronization signal, horizontal synchronization signal and output-image-data synchronizing signal outputted from the image processing section 3. Specifically, in a period when the vertical synchronizing signal is effective, image data is sampled and loaded at a rise of the outputting-image-data synchronizing signal in a period when the horizontal synchronizing signal is effective. The record and display control section 4 corresponds to an output control device.

Figure 2:
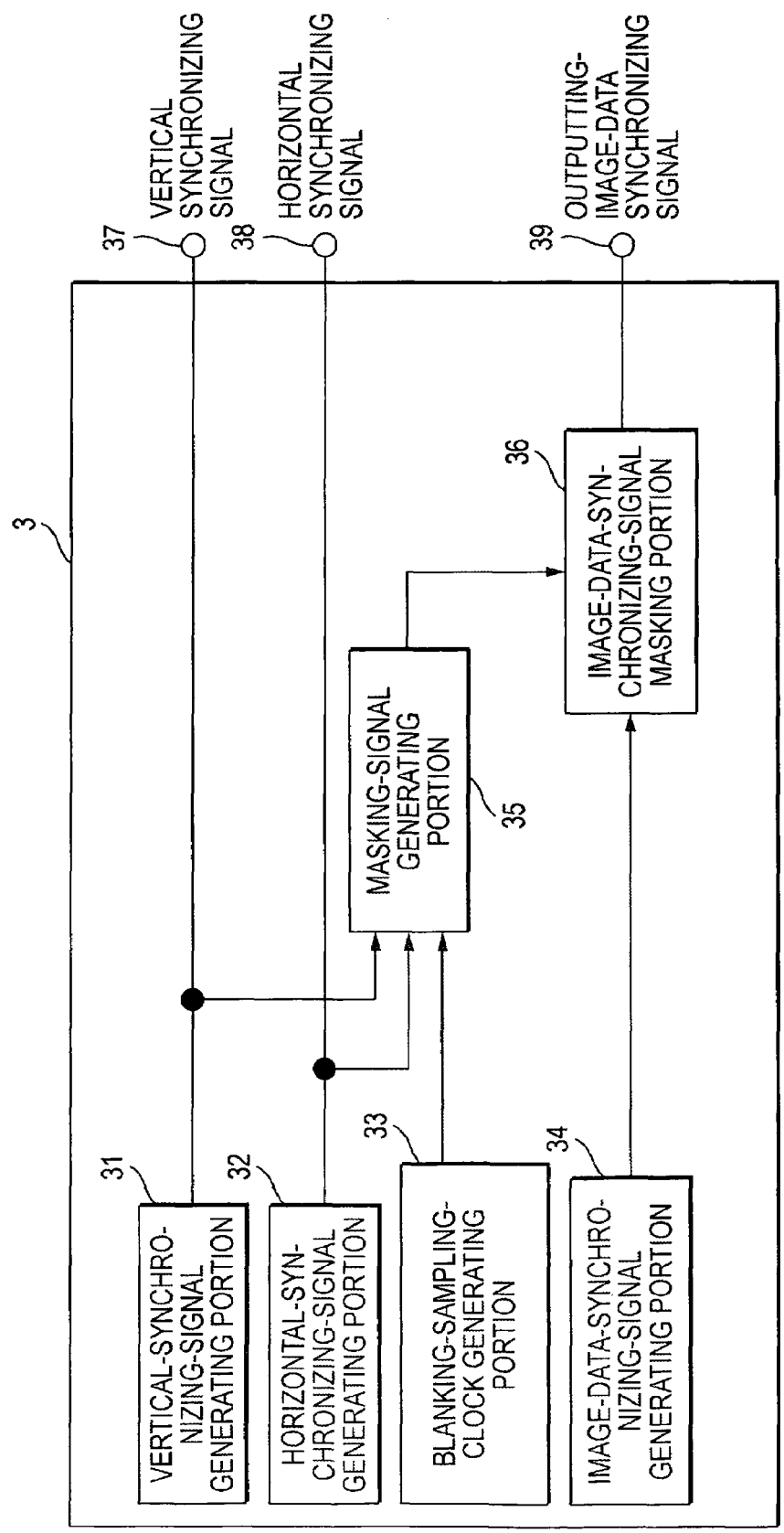
FIG. 2 is a block diagram showing an internal configuration of an image processing section shown in FIG. 1.
Figure 3:
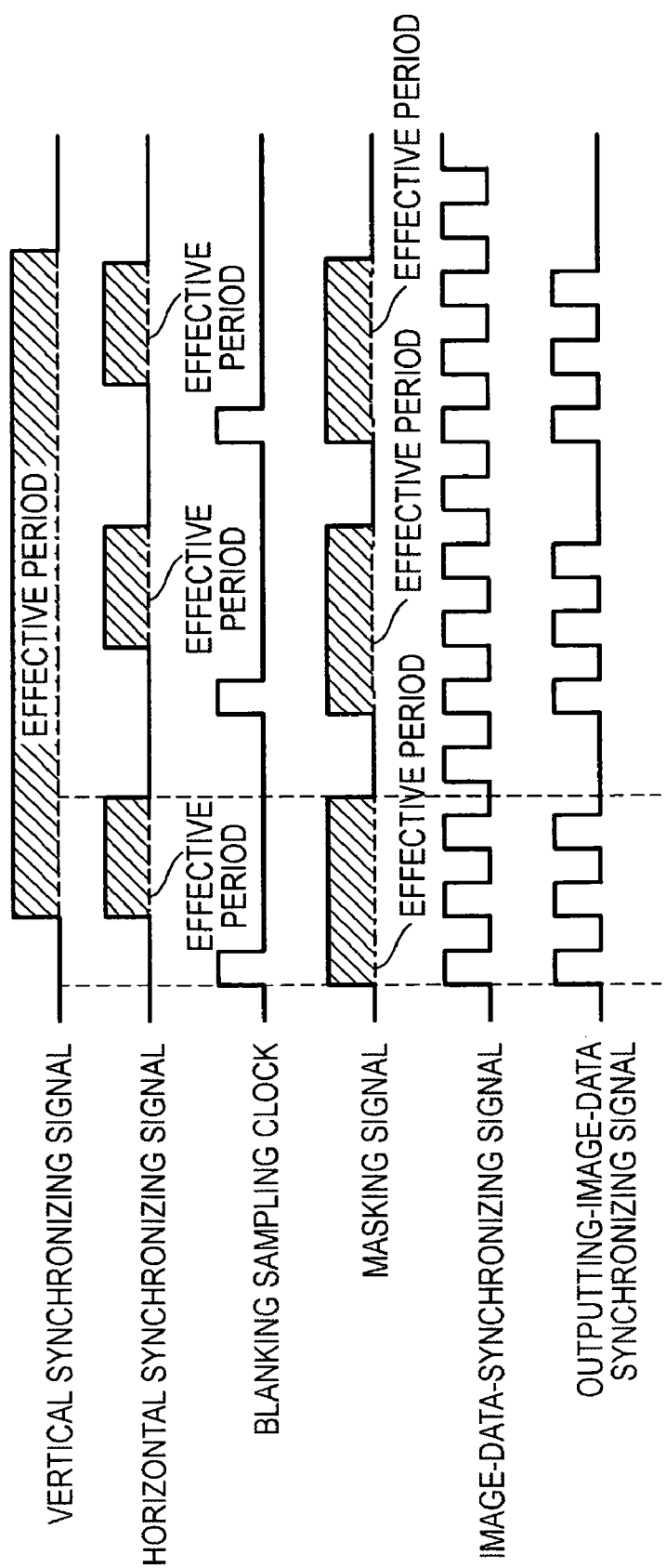
FIG. 3 is a timing chart illustrating the timing to output signals from the respective blocks shown in FIG. 2.

FIG. 2 is a block diagram showing an internal configuration of the image processing section 3 shown in FIG. 1. FIG. 3 is a timing chart illustrating the output timing of the signals outputted from various blocks.

As shown in FIG. 2, the image processing section 3 has a vertical-synchronizing-signal generating portion 31, a horizontal-synchronizing-signal generating portion 32, a blanking-sampling-clock generating portion 33, an image-data-synchronizing-signal generating portion 34, a masking-signal generating portion 35, an image-data-synchronizing-signal masking portion 36, and output terminals 37, 38, 39. The blanking-sampling-clock generating portion 33, the image-data-synchronizing-signal generating portion 34, the masking-signal generating portion 35 and the image-data-synchronizing-signal masking portion 36 constitute an outputting-image-data synchronizing signal generating section.

The vertical-synchronizing-signal generating portion 31 generates a vertical synchronizing signal from a master clock supplied from the external.

The horizontal-synchronizing-signal generating portion 32 generates a horizontal synchronizing signal from the master clock supplied from the external.

The blanking-sampling-clock generating portion 33 generates a blanking sampling clock that is a signal for detecting a rise of the horizontal synchronizing signal, from the master clock supplied from the external. Since the horizontal synchronizing signal rises right after a rise of the blanking sampling clock, the rise timing of the horizontal synchronizing signal can be detected by detecting the rise of the blanking sampling clock. The blanking-sampling-clock generating portion 33 corresponds to a detecting-signal generating section.

The image-data-synchronizing-signal generating portion 34 generates an image-data synchronizing signal that is a signal for the record and display control section 4 to load image data, from the master clock supplied from the external.

The masking-signal generating portion 35 generates a masking signal based on the vertical and horizontal synchronizing signals and the blanking sampling clock. The masking signal, i.e. signal to mask an image-data synchronizing signal, rises at a rise, of a blanking sampling clock, for detecting a rise of a horizontal synchronizing signal that becomes effective in a period when the vertical synchronizing signal is effective, and falls at a fall of the horizontal synchronizing signal right after a fall in the relevant blanking sampling clock (see FIG. 3).

The image-data-synchronizing-signal masking portion 36 performs a masking on the image-data synchronizing signal in a period when the masking signal is ineffective, based on the image-data synchronizing signal and masking signal, and generates an outputting-image-data synchronizing signal (see FIG. 3). The image-data-synchronizing-signal masking portion 36 outputs a signal provided as an outputting-image-data synchronizing signal having a suspension period in a duration that the vertical synchronizing signal is effective and the horizontal synchronizing signal is ineffective. The image-data-synchronizing-signal masking portion 36 corresponds to a masking unit.

The output terminal 37 is a terminal for outputting a vertical synchronizing signal to the record and display control section 4. The output terminal 37 corresponds to a first output terminal.

The output terminal 38 is a terminal for outputting a horizontal synchronizing signal to the record and display control section 4. The output terminal 37 corresponds to a third output terminal.

The output terminal 39 is a terminal for outputting the image-data synchronizing signal, masked by the image-data-synchronizing signal masking section 36, to the record and display control section 4. The output terminal 37 corresponds to a second terminal.

Receiving FIG. 3 vertical synchronizing signal, horizontal synchronizing signal and outputting-image-data synchronizing signal from the image processing section 3, the record and display control section 4 samples the image data at a rise of the outputting-image-data synchronizing signal in a duration that both the vertical and horizontal synchronizing signals are effective, and outputs the image data loaded by sampling to the display 6 and recording memory 7. This allows the display 6 to display an image and the recording memory 7 to record image data.

As discussed above, according to the digital camera in the present embodiment, the image processing section 3 suspends an outputting-image-data synchronizing signal from outputting in a duration that the vertical synchronizing signal is effective and the horizontal synchronizing signal is ineffective. This can eliminates the useless consumption of power and realize the reduction of consumption power.

Incidentally, although the blanking sampling clock in the embodiment was allowed to rise a little before a rise of the horizontal synchronizing signal, it may rise simultaneous with a rise of the horizontal synchronizing signal. In such a case, the masking signal is effective in the same period as the horizontal synchronizing signal. This can increase longer the period to suspend the outputting-image-data synchronizing signal as compared to the FIG. 3 case, thus reducing further the consumption power.

In the embodiment, the image processing section 3 outputted vertical, horizontal and outputting-image-data synchronizing signals as signals required for the record and display control section 4 to load the image data. However, the record and display control section 4 can load image data even unless outputting a horizontal synchronizing signal. In this case, the record and display control section 4 is required to be previously aware of the timing that the outputting-image-data synchronizing signal rises in a period when the horizontal synchronizing signal is effective and the number of times of rising. In the case the FIG. 3 vertical and outputting-image-data synchronizing signals are outputted, the record and display control section 4 satisfactorily repeats the operation of image-data sampling in the second and third rises since starting the output of an outputting-image-data synchronizing signal. This can omit the output terminal 38 from the image processing section 3, thus reducing the manufacturing cost for a digital camera.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2005-298552, filed Oct. 13, 2005, the entire disclosure of which is herein incorporated by reference.

What is claimed is:

1. An image-data output device that outputs image data and a signal for an output control device to load the image data, the output control device taking control of outputting the image data to a device, the image-data output device comprising:

a first signal generating section that generates a vertical synchronizing signal for the output control device to load the image data;

a second signal generating section that generates a horizontal synchronizing signal;

a third signal generating section that generates an outputting-image-data synchronizing signal for the output control device to load the image data, the outputting-image-data synchronizing signal having a suspension period in a duration that the vertical synchronizing signal is effective and the horizontal synchronizing signal is ineffective;

a first output terminal that outputs the vertical synchronizing signal to the output control device; and a second output terminal that outputs the outputting-image-data synchronizing signal to the output control device.

2. The image-data output device according to claim 1, wherein the third signal generating section comprises:

a first signal generating unit that generates an image-data synchronizing signal for the output control device to load the image data;

a second signal generating unit that generates a detecting signal for detecting a rise of the horizontal synchronizing signal becoming effective in a period when the vertical synchronizing signal is effective;

a third signal generating unit that generates a masking signal based on the vertical synchronizing signal, the horizontal synchronizing signal and the detecting signal, wherein the masking signal is a signal for masking the image-data synchronizing signal, and the masking signal rises at a rise of the detecting signal and falls at a fall of the horizontal synchronizing signal right after the rise of the detecting signal; and a masking unit that makes a masking, based on the image-data synchronizing signal and the masking signal, on the image-data synchronizing signal in a period when the masking signal is ineffective, so as to generate the outputting-image-data synchronizing signal.

3. The image-data output device according to claim 1, further comprising a third output terminal that outputs the horizontal synchronizing signal, which is for the output control device to load the image data, to the output control device.

4. The image-data output device according to claim 2, further comprising a third output terminal that outputs the horizontal synchronizing signal, which is for the output control device to load the image data, to the output control device.

5. A digital camera comprising an image-data output device according to claim 1.

* * * * *